(12) United States Patent
Pouli et al.

(10) Patent No.: US 11,202,032 B2
(45) Date of Patent: Dec. 14, 2021

(54) METHOD FOR CONVERTING AN IMAGE AND CORRESPONDING DEVICE

(71) Applicant: FONDATION B-COM, Cesson Sevigne (FR)

(72) Inventors: Foteini Tania Pouli, Le Rheu (FR); Cambodge Bist, Karlsruhe (DE); Jean-Yves Aubie, Melesse (FR)

(73) Assignee: FONDATION B-COM, Cesson Sevigne (FR)

( * ) Notice: Subject to any disclaimer, the term of this patent is extended or adjusted under 35 U.S.C. 154(b) by 0 days.

(21) Appl. No.: 17/127,115

(22) Filed: Dec. 18, 2020

(65) Prior Publication Data
US 2021/0195139 A1 Jun. 24, 2021

(30) Foreign Application Priority Data
Dec. 20, 2019 (EP) .................................... 19306742

(51) Int. Cl.
*G06T 5/00* (2006.01)
*H04N 9/77* (2006.01)
*H04N 7/01* (2006.01)

(52) U.S. Cl.
CPC ........... *H04N 7/0125* (2013.01); *G06T 5/009* (2013.01); *H04N 9/77* (2013.01); *G06T 2207/20208* (2013.01)

(58) Field of Classification Search
CPC .. H04N 9/77; G06T 5/009; G06T 2207/20208
See application file for complete search history.

(56) References Cited

U.S. PATENT DOCUMENTS

| 9,736,507 B2 * | 8/2017 | Oh ................. H04N 21/234327 |
| 9,912,839 B2 * | 3/2018 | Kervec ................ H04N 1/6027 |

(Continued)

FOREIGN PATENT DOCUMENTS

| WO | 2012/127401 A1 | 9/2012 |
| WO | 2015/077329 A1 | 5/2015 |

(Continued)

OTHER PUBLICATIONS

Search Report issued in European Patent Application No. 19 30 6742 dated May 29, 2020.

(Continued)

*Primary Examiner* — Brian P Yenke
(74) *Attorney, Agent, or Firm* — Nixon & Vanderhye (57) ABSTRACT

A method is described for converting an input image into an output image, the output image including an output luminance component made of elements. The method includes: obtaining an input luminance component from the input image; determining the output luminance component, the respective ranges of the output luminance component element values and input luminance component element values being of different range extension, the determining step including: —determining a first intermediate luminance component from the input luminance component and an exponent, —obtaining a mapping profile allowing for mapping a luminance component based on the input luminance component into the output luminance component, —determining a second intermediate luminance component from the input luminance component and the obtained mapping profile, —determining the output luminance component from the first and second intermediate luminance components; and converting the input image into the output image.

20 Claims, 2 Drawing Sheets

(56) References Cited

U.S. PATENT DOCUMENTS

| | | | | |
|---|---|---|---|---|
| 10,326,971 B2* | 6/2019 | Bist | .................. | H04N 9/646 |
| 10,574,936 B2* | 2/2020 | Wu | .................. | H04N 9/77 |
| 10,594,997 B2* | 3/2020 | Thompson | .......... | H04N 11/20 |
| 10,628,929 B2* | 4/2020 | Lin | .................. | G06T 5/009 |
| 10,645,359 B2* | 5/2020 | Bist | .................. | G06T 5/009 |
| 10,796,419 B2* | 10/2020 | Hwang | .......... | H04N 9/77 |
| 11,102,463 B2* | 8/2021 | Bist | .................. | G06T 5/007 |
| 2018/0005357 A1* | 1/2018 | Lasserre | .......... | H04N 5/57 |
| 2018/0167597 A1* | 6/2018 | Seifi | .................. | H04N 11/20 |
| 2018/0352257 A1* | 12/2018 | Leleannec | .......... | H04N 19/60 |
| 2019/0114749 A1* | 4/2019 | Pouli | .................. | G06T 5/009 |

FOREIGN PATENT DOCUMENTS

| | | |
|---|---|---|
| WO | 2016/091406 A1 | 6/2016 |
| WO | 2017/103399 | 6/2017 |

OTHER PUBLICATIONS

Cappetta et al., "An FPGA Oprimization of a Multiple Resolution Architecture for LDR to HDR Image Conversion", Computer Science, 2017 International Symposium on Signals, Circuits and Systems (ISSCS), 2017, 4 pages.

Reinhard et al., "Image display algorithms for high- and low-dynamic-range display devices", Journal of the Society for Information Display, Dec. 2007, vol. 15, No. 12, pp. 997-1014.

* cited by examiner

METHOD FOR CONVERTING AN IMAGE AND CORRESPONDING DEVICE

CROSS-REFERENCE TO RELATED APPLICATION

This application is related to and claims priority from EP Patent Application No. 19 306 742.8 filed on Dec. 20, 2019, the contents of which are hereby incorporated by reference.

BACKGROUND OF THE INVENTION

Field of the Invention

The present invention relates generally to converting an image, in particular a video picture.

Description of the Related Art

Recent advancements in display technology are beginning to allow an extended range of luminance to be displayed. Technologies allowing for extensions in the range of luminance in image content are known as "High Dynamic Range" imaging, often shortened to HDR.

To prepare standard content, herein referred to as SDR for "Standard Dynamic Range, for HDR display devices, reverse (or inverse) tone mapping operators (ITMO) can be employed. Such methods process notably the luminance information of colored areas in the image content with the aim of recovering or recreating the appearance of the original scene. Typically, ITMOs take a SDR image as input, expand the luminance range and subsequently process highlights or bright regions locally to enhance the HDR appearance of colors in the corresponding image. For example, the patent application WO/2017/103399 provides a solution for mapping the values of both luminance components by using an appropriate exponent. The proposed mapping is adapted to process the brightness according to the image content.

The ability to perform round-tripping, i.e. to convert SDR content to HDR and then back to SDR again, whilst minimizing the change to the visual experience, may be a requirement for some devices like display devices. Likewise, round-tripping from HDR to SDR and then back to HDR may also be a requirement.

SUMMARY OF THE INVENTION

In this context the invention proposes a method for converting an input image into an output image, the output image including an output luminance component made of elements. The method comprises:

obtaining an input luminance component from the input image (the input luminance component being also made of elements), determining the output luminance component, the respective ranges of the output luminance component element values and input luminance component element values being of different range extension, said determining step including:

determining a first intermediate luminance component from the input luminance component and an exponent, obtaining a mapping profile allowing for mapping a luminance component based on the input luminance component into the output luminance component, determining a second intermediate luminance component from the input luminance component and the obtained mapping profile, determining the output luminance component from the first and second intermediate luminance components, and converting the input image into the output image.

Having distinct first and second determining steps involves a more robust process. Thanks to the invention, changing of external choices, context or parameters, does not imply anymore an update of the first determining step involving an exponent. This update can be quite complex. The changes can be handled during the second determining step, in particular by obtaining an appropriate mapping profile. Moreover, the inventors have observed that performing the second determining step on a luminance component instead of a color component prevent for artefacts, such as shifts in image hues.

In an embodiment, the step of determining a first intermediate luminance component and the step of determining a second intermediate luminance component are performed sequentially, regardless of a performing order.

In an embodiment, the step of determining a second intermediate luminance component and the step of determining a first intermediate luminance component are performed sequentially, the first intermediate luminance component being determined from the second intermediate luminance component and the exponent.

In an embodiment, the step of determining a first intermediate luminance component and the step of determining a second intermediate luminance component are performed sequentially, the second intermediate luminance component being determined from the first intermediate luminance component and the obtained mapping profile.

In an embodiment, the second intermediate luminance component is determined by using an invertible formulation.

In an embodiment, a mapping profile involves extrinsic parameters.

For example, the method may further comprise displaying the output image on a display device, said extrinsic parameters characterizing the display device.

In an embodiment, the method further comprises a calculating step where the exponent is calculated as a function of a logarithm of a global luminosity level of the input image perceived by the observer.

For example, the exponent is calculated in order to monotonically decrease when the median of the input image luminance component increases.

For example, the exponent $\gamma$ is calculated according to the following function:

$$\gamma = \frac{1}{\text{gain} \times \log_{10}(f(L_{in})) + \text{offset}}$$

where $\gamma$ is the exponent, gain a predetermined gain value, offset a predetermined offset value, $L_{in}$ is the input image luminance component, and f is a function for obtaining the global luminosity level of the input image from the input image luminance component.

In an embodiment, mapping profiles are inverse tone mapping profiles.

In this case, the second intermediate luminance component may be determined as follows:

$$L = \frac{m_b * (L_{lin})^{\frac{1}{m_c}}}{m_a - (L_{lin})^{\frac{1}{m_c}}}$$

where $m_a$, $m_b$ and $m_c$ are constant parameters defining the obtained mapping profile, L is the second intermediate luminance component, and $L_{lin}$ is the input luminance component.

In an embodiment, mapping profiles are tone mapping profiles.

In this case, the second intermediate luminance component may be determined as follows:

$$L = \left( \frac{m_a * f(L_{lin})}{m_b + f(L_{lin})} \right)^{m_c}$$

where $m_a$, $m_b$ and $m_c$ are constant parameters defining the obtained mapping profile, L is the second intermediate luminance component, and $f(L_{lin})$ is a luminance component obtained from the input luminance component.

In an embodiment, the method further comprises
obtaining selection information, and
so obtaining the mapping profile by selecting a mapping profile among a plurality of predetermined mapping profiles according to said selection information.

The invention also proposes a device for converting an input image into an output image, the output image including an output luminance component made of elements, the device being configured to execute the following steps:
obtaining an input luminance component from the input image,
determining the output luminance component, the respective ranges of the output luminance component element values and input luminance component element values being of different range extension, said determining step including:
determining a first intermediate luminance component from the input luminance component and an exponent,
obtaining a mapping profile allowing for mapping a luminance component based on the input luminance component into the output luminance component,
determining a second intermediate luminance component from the input luminance component and the obtained mapping profile,
determining the output luminance component from the first and second intermediate luminance components, and
converting the input image into the output image.

The device has the same advantages as the method defined above.

The invention also proposes a method for converting an input image into an output image, the output image including an output luminance component made of elements, the method comprising:
obtaining an input luminance component from the input image,
determining the output luminance component, the respective ranges of the output luminance component element values and input luminance component element values being of different range extension,
converting the input image into the output image,
wherein the step of determining the output luminance component includes:
obtaining a mapping profile,
determining an intermediate luminance component from the input luminance component and the obtained mapping profile,
determining the output luminance component from the intermediate luminance component and an exponent.

The exponent is for instance calculated from the intermediate luminance component, as further explained below.

The invention also proposes a method for converting an input image into an output image, the output image including an output luminance component made of elements, the method comprising:
obtaining an input luminance component from the input image,
determining the output luminance component, the respective ranges of the output luminance component element values and input luminance component element values being of different range extension,
converting the input image into the output image,
wherein the step of determining the output luminance component includes:
determining an intermediate luminance component from the input luminance component and an exponent,
obtaining a mapping profile,
determining the output luminance component from the intermediate luminance component and the obtained mapping profile.

The exponent is for instance calculated from the input luminance component, as further explained below.

For the purposes of this disclosure, "element" may refer to a single pixel (or picture element) of a component (e.g. a luminance component) of still image, or of a frame or subframe of a video image. More generally, "element" refers to any structure with which a particular value (here a particular value of luminance) is associated to partly define an image.

At least parts of the method according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

The invention will now be described by means of specific non-limiting exemplary embodiments and by reference to the figures.

DESCRIPTION OF THE PREFERRED EMBODIMENTS

Figure 1:
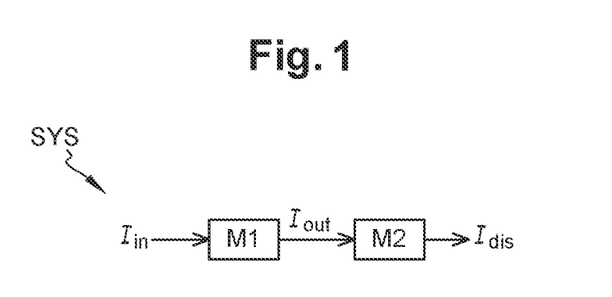
FIG. 1 schematically illustrates a system incorporating a device according to the invention.

FIG. 1 illustrates a representation of a system SYS according to the invention. The system SYS comprises means M1 for converting an input image into an output image. Here, the converting means M1 are linked to other means M2, for instance means for displaying the image on a display device like a television or a camera. The converting means M1 receives an input image 6 and provides an output image $I_{out}$ to the displaying means M2. The input image 6 may be a still image or an image from a video sequence or one of the different image components (luminance or chrominance for instance). From the output image $I_{out}$, the other means M2 determines an image $I_{dis}$ to be displayed on the display device.

Alternatively, M2 could be mixing means like a video switcher (Sony MVS-8000X for example) configured for mixing signals in different formats. Then the other means M2 provides images resulting from the mix of different input signals including the one delivered by the converting means M1.

The converting means M1 are able to process the luminance component of the input image $I_{in}$ in order to provide the luminance component of the output image $I_{out}$. Both luminance components have different range extensions. For example, the input image $I_{in}$ can be a SDR image and the output image $I_{out}$ an HDR image. In this case, it is referred to tone expansion or inverse (or reverse) tone mapping (ITMO). On the contrary the input image 6 can be a HDR image and the output image $I_{out}$ an SDR image. It is then referred to tone mapping or tone compression (TMO). For example, ITMO means function is to extend the range of values of a first interval [0:1] at a second range of values $[0:L_{max}]$, where $L_{max}$ represents the length of the second interval, $L_{max}$ being an integer greater than 1. For example, with an HDR screen standard, if the peak luminance of the screen is 1000 nits or cd/m2, then $L_{max}$ is 1000 (see Report ITU-R BT.2446-0 (April/2019) *"Methods for conversion of high dynamic range content to standard dynamic range content and vice-versa"*.)

The converting means M1 may be configured to perform round-tripping from SDR image to HDR image and back to SDR image or vice versa from HDR image to SDR image and back to HDR image.

Figure 2:
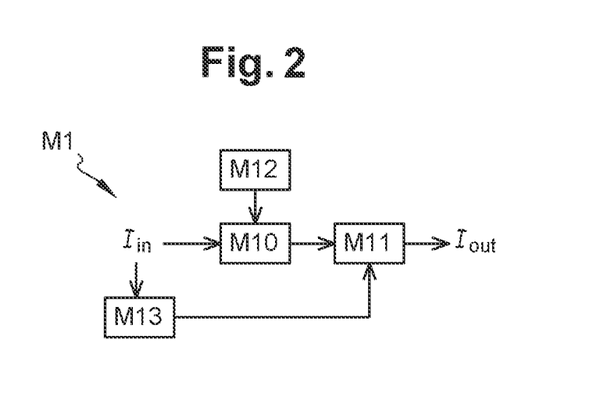
FIG. 2 illustrates an embodiment of a device according to the invention.

FIG. 2 shows a first embodiment of the converting means M1 according to the invention. The converting means M1 comprises first mapping means M10 for performing a first mapping step. This first mapping step is referred to be a static mapping. The converting means M1 also comprise second mapping means M11 for performing a second mapping step, which is referred to be a dynamic mapping. Both means M10 and M11 are arranged in series.

The static mapping allows for adapting the luminance component of the delivered image to features not related to the image content, such as a capturing camera, a display device, a video switcher, information provided by other channels or preferences of a director of photography for instance. A set of parameters defines a mapping profile for the display device or stylistic choices for example. If the display device is switched by another one, another mapping profile is obtained.

Means M12 is able to provide a suitable profile to the means M10 for performing the dynamic mapping. The appropriate profile may be selected among a plurality of profiles, each one corresponding to a type of display device, for example a Sony KD-55X9305C or a LG Oled 55EG960V.

The dynamic mapping allows for adapting the luminance component of the delivered image to the image content. It aims at reflecting at the best, the image characteristics and style (landscape, portrait, neutral, standard . . . ). To perform the dynamic mapping, the means M11 is linked to other means M13 which is able to provide information about the input image content $I_{in}$. Such information can be for example the computed median value of the input luminance component.

Having distinct first and second mapping steps, allows for separating the image-adaptive aspect of luminance expansion or compression from the overall behavior of the luminance expansion or compression operator, overall behavior induced par external factors mentioned above. This separation of both mapping steps according to the invention, involves a more robust process. Indeed changing of display device does not require anymore to perform a new optimization of the dynamic mapping, which is a complex operation. Moreover, the inventors have observed that performing the static mapping on a luminance component instead of a color component prevent for artefacts, such as shifts in image hues.

Figure 3:
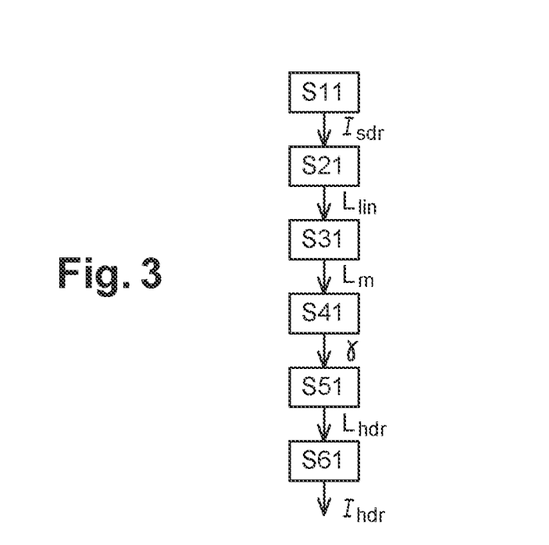
FIG. 3 illustrates another embodiment of a device according to the invention.

FIG. 3 illustrates a method for converting an input image into an output image according to a first embodiment of the invention. The example below considers an SDR image as an input image and a HDR image as an output image. One skilled in the art could adapt the method according to other input/output images, for instance a HDR input image and a corresponding SDR output image. The first embodiment can be implemented by the converting means M1 in FIG. 2.

A first step S11 comprises obtaining an input image $I_{sdr}$, for instance an SDR image in a nonlinear R'G'B' (for "Red Green Blue") space, as specified in ITU-R BT.709 standard. Of course, other standard may be considered like BT.2020 standard.

A second step S21 consists in obtaining an input luminance component $L_{lin}$, which is preferably here a linear luminance component (nonlinear luminance components may be considered for certain standards). For example, this luminance component $L_{lin}$ is determined by first converting the input image $I_{sdr}$ by applying first an inverse Opto-Electrical Transfer Function ("OETF$^{-1}$"). This Transfer Function represents the action of a sensor, converting brightness to data. The conversion allows for obtaining an image in a linear RGB space. Then the RGB image is converted in another linear space where the converted image comprises three components X, Y and Z, Y being a linear luminance component, called $L_{lin}$ in the following description In a third step S31, a static mapping is performed from the input linear luminance component $L_{lin}$ into an intermediate luminance component $L_m$. The mapping is formulated here as follows:

$$L_m = \frac{m_b * (L_{lin})^{\frac{1}{m_c}}}{m_a - (L_{lin})^{\frac{1}{m_c}}} \quad (1)$$

Where $m_a$, $m_b$, $m_c$ are parameters, whose predetermined and set values defining a mapping profile. This mapping profile as been obtained by setting the value of the parameters among plurality of possible values, to define the overall behavior of the luminance expansion operator, induced par external factors mentioned above.

For example in one implementation, the parameters $m_a$, $m_b$, $m_c$ may be set as follows to get a profile that is well adapted for commercial HDR television:

$m_a$=1.5284

$m_b$=0.5279

$m_c$=0.7997.

For example, the parameters are determined according to visual evaluation. In another example, the parameters may be determined based on the features defining the display device.

The formulation (1) is an example allowing for carrying out a stable static mapping, with a same behavior for different parameter values. Advantageously, this formulation is invertible, making it useable for round-tripping SDR to HDR and back to SDR.

Using the proposed formulation (1), a luminance mapping profile can be defined achieving a desired, overall behavior or style (e.g. an overall brighter expansion for a particular client wanting a strong 'HDR effect', or a more classic expansion or compression when addressing consumer televisions with mid-level specs for instance).

This is particularly useful as it means that the formulation used to compute the image-adaptive exponent can remain unchanged, only the parameter values for the static mapping are replaced.

Other formulations may be used, as the one below:

$$L_m = \left( \frac{L_{sdr} + m_d}{m_a} \right)^{\frac{1}{m_c}} - m_b \quad (2)$$

The parameters $m_a$, $m_b$, $m_c$ and $m_d$, whose predetermined and set values define another predetermined mapping profile. Their value may be set as follows to get a profile that is well adapted for commercial HDR television:

$m_a$=1.3475

$m_b$=0.0070

$m_c$=0.2844

$m_d$=−0.3285.

One skilled in the art could propose other parameterizable formulations adapted for computing intermediate luminance representation $L_m$ from the input linear luminance component $L_{lin}$, regarding the parameters on the selected mapping profile.

Preferably, if values of the input linear luminance component $L_{lin}$ belong to the range [0,1], the values of the intermediate luminance values $L_m$ belong to the same range.

Preferably, the formulation is invertible for enabling round-trippings.

In another embodiment, different mapping profiles may be available, for instance loaded in a dedicated memory. A first profile can be well adapted for displaying RGB images for commercial HDR television and a second profile can be well adapted for displaying images containing additional information defining a mask to apply on pictures. The mask could define a logo or provide statistics information to be displayed superimposed on background images capturing a sport game for instance. The mask could be delivered via an input alpha channel or, if a predefined mask-pattern like a logo is used, pre-loaded in a memory. The definition of such a second mapping profile allows for reducing uncomfortable effects which affect certain colors (like the whites) of superimposed pattern, when displayed. According to an information (for example it is detected that data related to a mask to superimpose is provided via the alpha channel), the first or the second mapping profile is selected.

Steps S21 and S31 may be implemented by the means M10 performing the static mapping.

In a step S41, an exponent $\gamma$ is calculated from the intermediate luminance component values $L_m$.

Preferably but not exclusively, the exponent $\gamma$ is computed through a monotonically decreasing function depending of the relevant luminance component based on the linear input luminance component, and more specifically from the median of this relevant luminance component values (here the intermediate luminance component). Alternatively, the mean or the geometric mean of this relevant luminance component values can be considered.

The patent application WO/2017/103399 provides an embodiment for computing a value of the exponent used for the expansion.

Alternatively, the exponent may be calculated as follows:

$$\gamma = \frac{1}{g * \log_{10}(L_{med}) + o} \quad (3)$$

where $g$ is a gain parameter, $o$ is an offset and $L_{med}$ is based on the median of the intermediate luminance component. Alternatively, $L_{med}$ is obtained as follows:

$$L_{med} = \max(\text{median}(L_m), \tau_{med}) \quad (4)$$

where $\tau_{med}$ is set to a minimum threshold, for example $\tau_{med}$=0.00001.

Advantageously, the formulation (4) for obtaining $L_{med}$ allows for a more stable performance for very dark images where the median value may be very low.

The gain parameter $g$ may be set as $g$=0.06 and the offset parameter may be set as $o$=1.0. The resulting expansion exponent $\gamma$ may be preferably limited within a range of 1.0 and 2.0 to ensure that the resulting image to display will not lead to results that are too extreme in outlier cases (e.g. very dark or very bright images). Limiting the range of values that the exponent $\gamma$ can take, has also the additional benefit of a more stable performance may be obtained in cases of quickly varying video content, where the tone expansion is adapted to each frame.

Then a step S51 comprises obtaining an expanded luminance component $L_{hdr}$, as follows:

$$L_{hdr} = (L_m)^{\gamma}. \quad (5)$$

The steps S41 and S51 may be implemented by the means M11 performing the dynamic mapping.

Finally in this example, a step S61 allows for rendering the image on a display device. It comprises scaling the expanded luminance component $L_{hdr}$ by using the corresponding RGB components (for "Red Green Blue"), the linear luminance component $L_{lin}$, and possibly the peak of luminance $L_{max}$ accordingly. Scaled $RGB_{hdr}$ components are obtained and converted in the nonlinear R'G'B' space by applying an OETF. Optionally the saturation of each component may be adjusted, for instance according to one the methods described in R. Fattal, D. Lischinski et M. Werman, «*Gradient domain high dynamic range compression*» ACM transactions on graphics (TOG), vol. 21, no 13, pp. 249-256, 2002, or R. Mantiuk, R. Mantiuk, A. Tomaszewska et W. Heidrich, «Color correction for tone mapping» Computer Graphics Forum, vol. 28, n° 12, pp. 193-202, 2009.

A final conversion provides colour intensities in the Y'CbCr format which decomposes the colour intensities into a luminance component Y' separated from the chrominance components Cb, Cr. This format Y'CbCr is a way of representing the colour space in video that is well suited to the transmission problematics. These components are encoded on 10 bits. Embodiments of the conversion step S61 is described in the literature, for example in Poynton, Charles "*Digital video and HD: Algorithms and Interfaces.*" Elsevier, 2012.)

The step S61 may be implemented by the means M2 in case it is displaying means.

Figure 4:
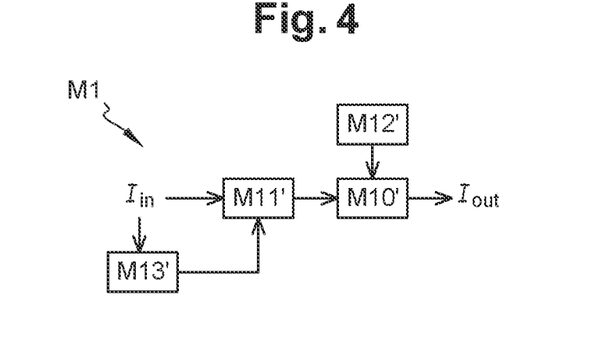
FIG. 4 illustrates an embodiment of a method according to the invention.

FIG. 4 shows a second embodiment of the converting means M1 according to the invention. Whereas the static mapping means M10 are set to perform of pre-processing of the linear luminance component in the first embodiment, it is set to perform a post-processing of the linear luminance component in this second embodiment.

The converting means M1 comprises in this order, the second mapping means M11' for performing a second mapping step, which is referred to be the dynamic mapping and the first mapping means M10' for performing the first mapping step, the static mapping. Both means M11' and M10' are arranged in series.

As for the first embodiment, means M12' is able to provide a suitable profile to the means M10' for performing the dynamic mapping. To perform the dynamic mapping, the means M11' is linked to other means M13' which is able to provide information about the input image content $I_{in}$.

Figure 5:
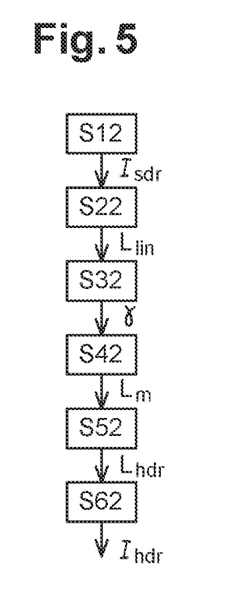
FIG. 5 illustrates another embodiment of a method according to the invention.

FIG. 5 illustrates a method for converting an input image into an output image according to a second embodiment of the invention.

A first step S12 comprises obtaining an input image $I_{sdr}$, for instance an SDR image.

A second step S22 consists in computing an input linear luminance component $L_{lin}$. Both first and second steps S21 and S22 may be similar to the first and second step S11 and S21 of the first embodiment.

Then in a third step S32 the exponent γ is calculated from the input linear luminance component $L_{lin}$. If applying the formulation (3) mentioned above, the exponent is calculated as follows:

$$\gamma = \frac{1}{g * \log_{10}(L_{med}) + o}$$

where g is a gain parameter, o is an offset and $L_{med}$ is based on the median of the input linear luminance component $L_{lin}$. Alternatively, $L_{med}$ is obtained as follows:

$$L_{med} = \max(\text{median}(L_{lin}), \tau_{med}) \quad (6)$$

where $\tau_{med}$ is set to a minimum threshold, for example $\tau_{med} = 0.00001$.

Then a step S42 comprises obtaining an intermediate luminance component $L_m$, as follows:

$$L_m = (L_{lin})^\gamma \quad (7)$$

In a fifth step S51, the static mapping is performed from the intermediate luminance component $L_m$ into an expanded luminance component $L_{hdr}$. As for the first embodiment, the static mapping is realized from appropriate predetermined and set parameter values and a suitable formulation, like one of the formulations (1) or (2) proposed above.

Finally a step S62 comprises processing the expanded luminance component $L_{hdr}$ to obtain Y'CbCr components, as described by reference to the step S61 for instance.

Figure 6:
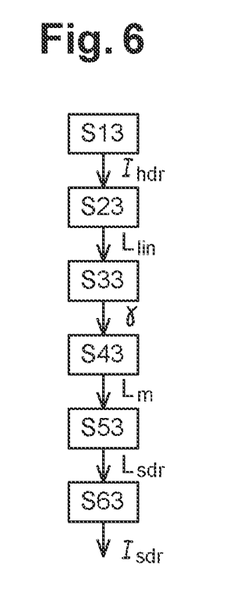
FIG. 6 illustrates another embodiment of a method according to the invention.

FIG. 6 illustrates a method for converting an input image into an output image according to a third embodiment of the invention. The example below considers a HDR image as an input image and an SDR image as an output image. In other words, the third embodiment describes a compression (or tone mapping) of a luminance component. Preferably but not restrictively, the static mapping is performed as a post-processing step in the case of luminance component compression.

A first step S13 comprises obtaining an input image $I_{hdr}$, which is a HDR image here.

A second step S23 consists in computing an input linear luminance component $L_{lin}$ using the appropriate known conversion process.

A third steps S33 comprises computing an exponent γ for luminance compression from the input linear luminance component $L_{lin}$, following the same formulation (3) mentioned above, as follows:

$$\gamma = \frac{1}{g * \log_{10}(L_{med}) + o}$$

where g is a gain parameter, o is an offset and $L_{med}$ is based on the median of the input linear luminance component $L_{lin}$. Alternatively, $L_{med}$ is obtained as follows:

$$L_{med} = \max(\text{median}(L_{lin}), \tau_{med})$$

where $\tau_{med}$ is set to a minimum threshold, for example $\tau_{med} = 0.00001$.

In a fourth step S43, an intermediate compressed luminance component $L_m$ is obtained as follows:

$$L_m = (L_{lin})^{\frac{1}{\gamma}} \quad (8)$$

In a fifth step S53, a static mapping is performed from the intermediate compressed luminance component $L_m$ into a compressed SDR luminance component $L_{sdr}$. The mapping is formulated as follows:

$$L_{sdr} = \left(\frac{m_a * L_m}{m_b + L_m}\right)^{m_c} \quad (9)$$

where $m_a$, $m_b$, $m_c$ are parameters whose predetermined and set values define another predetermined mapping profile. In one implementation, the parameters $m_a$, $m_b$, $m_c$ may be set as follows to obtain a profile that is well adapted for typical commercial television, symmetrically to the luminance expansion implementation described previously:

$m_a = 1.5284$ $m_b = 0.5279$ $m_c = 0.7997$.

Finally a step S63 comprises processing the compressed luminance component $L_{sdr}$ to obtain Y'CbCr components according to the appropriate standard, as described by reference to the step S61 for instance.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

What is claimed is:

1. A method for converting an input image into an output image, the output image including an output luminance component made of elements, the method comprising:
   obtaining an input luminance component from the input image,
   determining the output luminance component, wherein a range of the output luminance component element values differs from a range of the input luminance component element values, said determining step including:
      determining a first intermediate luminance component from the input luminance component and an exponent,
      obtaining a mapping profile that maps a luminance component based on the input luminance component into the output luminance component,
      determining a second intermediate luminance component from the input luminance component and the obtained mapping profile,
      determining the output luminance component from the first and second intermediate luminance components, and
   converting the input image into the output image;
   wherein the step of determining a first intermediate luminance component is performed either before or after the step of determining a second intermediate luminance component.

2. The method of claim 1, wherein the step of determining a second intermediate luminance component is performed before the step of determining a first intermediate luminance component, the first intermediate luminance component being determined from the second intermediate luminance component and the exponent.

3. The method of claim 1, wherein the step of determining a first intermediate luminance component is performed before the step of determining a second intermediate luminance component, the second intermediate luminance component being determined from the first intermediate luminance component and the obtained mapping profile.

4. The method of claim 1, wherein the second intermediate luminance component is determined by using an invertible formulation.

5. The method of claim 1, wherein the mapping profile comprises extrinsic parameters.

6. The method of claim 5, further comprising displaying the output image on a display device,
   wherein said extrinsic parameters characterize the display device.

7. The method of claim 1, further comprising a calculating step in which the exponent is calculated as a function of a logarithm of a global luminosity level of the input image perceived by an observer.

8. The method of claim 7, wherein the exponent is calculated in order to monotonically decrease when the median of the input image luminance component increases.

9. The method of claim 8, wherein the exponent γ is calculated according to the following function:

$$\gamma = \frac{1}{\text{gain} \times \log_{10}(f(L_{in})) + \text{offset}}$$

where γ is the exponent, gain is a predetermined gain value, offset is a predetermined offset value, $L_{in}$ is the input image luminance component, and f is a function for obtaining the global luminosity level of the input image from the input image luminance component.

10. The method of claim 1, wherein the mapping profile is an inverse tone mapping profile.

11. The method of claim 10, wherein the second intermediate luminance component is determined as follows:

$$L = \frac{m_b * (L_{lin})^{\frac{1}{m_c}}}{m_a - (L_{lin})^{\frac{1}{m_c}}}$$

where $m_a$, $m_b$ and $m_c$ are constant parameters defining the obtained mapping profile,
L is the second intermediate luminance component, and
$L_{lin}$ is the input luminance component.

12. The method of claim 1, wherein the mapping profile is a tone mapping profile.

13. The method of claim 12, wherein the second intermediate luminance component is determined as follows:

$$L = \left( \frac{m_a * f(L_{lin})}{m_b + f(L_{lin})} \right)^{m_c}$$

where $m_a$, $m_b$ and $m_c$ are constant parameters defining the obtained mapping profile,
L is the second intermediate luminance component, and
$f(L_{lin})$ is a luminance component obtained from the input luminance component.

14. The method of claim 1, further comprising
   obtaining selection information, and
   obtaining the mapping profile by selecting a mapping profile from among a plurality of predetermined mapping profiles according to said selection information.

15. A device for converting an input image into an output image, the output image including an output luminance component made of elements, the device being configured to execute the following steps:
   obtaining an input luminance component from the input image, determining the output luminance component, wherein a range of the output luminance component element values differs from a range of the input luminance component element values, said determining step including:
  determining a first intermediate luminance component from the input luminance component and an exponent,
  obtaining a mapping profile that maps a luminance component based on the input luminance component into the output luminance component,
  determining a second intermediate luminance component from the input luminance component and the obtained mapping profile,
  determining the output luminance component from the first and second intermediate luminance components, and
converting the input image into the output image;
wherein the step of determining a first intermediate luminance component is performed either before or after the step of determining a second intermediate luminance component.

16. The device of claim 15, wherein the step of determining a second intermediate luminance component is performed before the step of determining a first intermediate luminance component, the first intermediate luminance component being determined from the second intermediate luminance component and the exponent.

17. A method for converting an input image into an output image, the output image including an output luminance component made of elements, the method comprising:
  obtaining an input luminance component from the input image,
  determining the output luminance component, wherein a range of the output luminance component element values differs from a range of the input luminance component element values,
  converting the input image into the output image,
  wherein the step of determining the output luminance component includes:
    obtaining a mapping profile,
    determining an intermediate luminance component from the input luminance component and the obtained mapping profile, and
    determining the output luminance component from the intermediate luminance component and an exponent.

18. The method of claim 17, wherein the exponent is calculated from the intermediate luminance component.

19. A method for converting an input image into an output image, the output image including an output luminance component made of elements, the method comprising:
  obtaining an input luminance component from the input image,
  determining the output luminance component, wherein a range of the output luminance component element values differs from a range of input luminance component element values,
  converting the input image into the output image,
  wherein the step of determining the output luminance component includes:
    determining an intermediate luminance component from the input luminance component and an exponent,
    obtaining a mapping profile, and
    determining the output luminance component from the intermediate luminance component and the obtained mapping profile.

20. The method of claim 19, wherein the exponent is calculated from the input luminance component.

\* \* \* \* \*